(12) United States Patent
Lima et al.

(10) Patent No.: US 7,916,652 B1
(45) Date of Patent: Mar. 29, 2011

(54) ANALYZING NETWORK TRAFFIC TO DIAGNOSE SUBSCRIBER NETWORK ERRORS

(75) Inventors: Paulo Lima, Kanata (CA); Greg Sidebottom, Ottawa (CA); Robert Enns, Los Gatos, CA (US); Craig A. Bardenheuer, Harvard, MA (US); William P. Welch, Wakefield, MA (US); Dean Sheffield, Groton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1555 days.

(21) Appl. No.: 11/257,798

(22) Filed: Oct. 25, 2005

(51) Int. Cl.
*H04L 12/26* (2006.01)
(52) U.S. Cl. .................................. 370/252; 370/253
(58) Field of Classification Search .................. 370/252, 370/429, 232, 445, 241, 352, 230; 455/67, 455/67.11; 709/219; 705/40; 714/776
See application file for complete search history.

(56) References Cited

U.S. PATENT DOCUMENTS

| | | | |
|---|---|---|---|
| 7,162,682 B2 * | 1/2007 | Lewis | 714/776 |
| 2001/0014103 A1 * | 8/2001 | Burns et al. | 370/429 |
| 2002/0091636 A1 * | 7/2002 | Carroll Bullard | 705/40 |
| 2003/0198247 A1 * | 10/2003 | Gardner et al. | 370/445 |
| 2004/0228329 A1 * | 11/2004 | Schmidt | 370/352 |
| 2004/0257994 A1 * | 12/2004 | Paskett et al. | 370/230 |
| 2005/0157646 A1 * | 7/2005 | Addagatla et al. | 370/232 |
| 2006/0015576 A1 * | 1/2006 | Seo et al. | 709/219 |
| 2006/0034185 A1 * | 2/2006 | Patzschke et al. | 370/252 |
| 2006/0067237 A1 * | 3/2006 | Burns et al. | 370/241 |
| 2006/0264178 A1 * | 11/2006 | Noble et al. | 455/67.11 |

* cited by examiner

*Primary Examiner* — Kwang B Yao
*Assistant Examiner* — Syed M Bokhari
(74) *Attorney, Agent, or Firm* — Shumaker & Sieffert, P.A.

(57) ABSTRACT

A service provider network includes an automated support module that receives stream of network packets from subscribers and separates this streams into packet flows for analysis. The automated support module may be an intermediate device that examines each packet flow to detect subscriber characteristics for each subscriber. The automated support module may apply a set of analysis rules to the detected characteristics to aid diagnosis of reported or potential network errors.

43 Claims, 5 Drawing Sheets

ANALYZING NETWORK TRAFFIC TO DIAGNOSE SUBSCRIBER NETWORK ERRORS

TECHNICAL FIELD

The invention relates to computer networks and, more particularly, to troubleshooting network errors for customers.

BACKGROUND

A network service provider is an enterprise that supplies one or more services over a computer network to a set of customers, also referred to as subscribers. For instance, an Internet Service Provider (ISP) supplies residential or business subscribers with access to the Internet. Residential subscribers are often large in number and typically lack technical knowledge.

Residential subscribers frequently encounter problems with their computing devices and do not have the expertise to correct the problems themselves. Consequently, subscribers contact the service provider for assistance. It is then the duty of a representative of the service provider to diagnose the problems and offer solutions.

Service providers often provide static checklists or questionnaires via the Internet to aid the customer or front-line customer service representative in diagnosing the problem. However, many of the questions in the checklists are irrelevant because they do not elicit the information that the service provider actually needs. In addition, subscribers, lacking technical expertise, often do not understand the questions or may offer answers that confuse the representative. Consequently, fixed checklists are inefficient means of assessing the status of a subscriber's network.

The task of the representative is often made more difficult because residential subscribers can seldom distinguish between problems with their internal network and problems with the service provider's product. Further, the increased use of home routers and multiple Internet-enabled devices per subscriber location has made diagnosing and resolving network problems even more difficult. Because of the complexities and diversity of modern home networks, and the limited usefulness of static checklists, service providers often face great difficulties in analyzing their subscribers' networks.

SUMMARY

In general, principles of the invention are directed to customer service support techniques that analyze subscriber network traffic to collect subscriber information to develop an accurate view of which devices and software are located at each subscriber location. For example, an automated support module executing at a service provider network monitors and performs analysis on streams of packets from subscribers to develop a database of subscriber characteristics. In the event a customer experiences a network error, the automated support module utilizes collected subscriber characteristics for the particular subscriber location along with the information reported by the customer with respect to the particular problem to suggest targeted troubleshooting suggestions. The automated support module may include an intelligent rule-based engine that applies a set of rules to the information to automatically generate the suggestions for, among others, customer care representatives, network analysts, or the subscribers themselves. The automated support module allows an administrator to define rules to govern the detection and subsequent analysis of subscriber characteristics.

In one embodiment, a method comprises receiving a stream of packets associated with a subscriber network. The method also comprises examining the stream of packets with a network device coupled to the subscriber network and a service provider network to detect a subscriber characteristic for the subscriber network, and diagnosing a network error associated with the subscriber network using the detected subscriber characteristic.

In another embodiment, a system comprises a characteristic detection engine that receives a stream of packets associated with a subscriber network and examines the stream of packets to detect whether a characteristic exists for the subscriber network. In addition, the system includes a knowledge base that diagnoses a network error associated with the subscriber network using subscriber characteristics detected by the characteristic detection engine.

In another embodiment, a computer-readable medium comprises instructions for causing a processor to receive a stream of packets associated with a subscriber network. The instructions also cause the processor to examine the stream of packets to detect whether a characteristic exists for the subscriber network. In addition, the instructions cause the processor to diagnose a network error associated with the subscriber network using detected subscriber characteristics.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
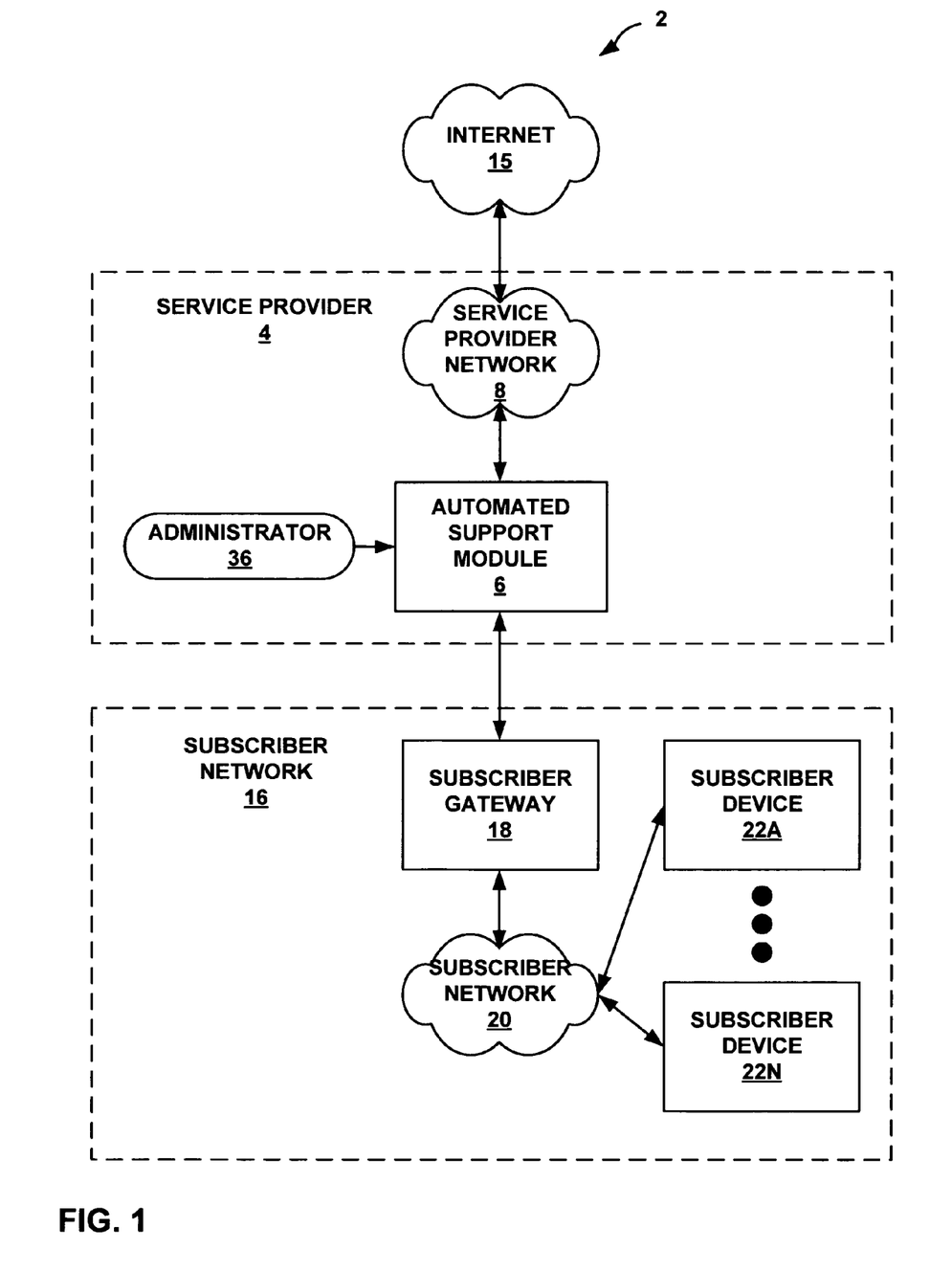
FIG. 1 is a block diagram illustrating an exemplary system in which a service provider employs an automated support module that detects subscriber characteristics and uses the detected subscriber characteristics to diagnose a network error associated with a subscriber.

FIG. 1 is a block diagram illustrating an exemplary system 2 in which service provider 4 employs an automated support module ("ASM") 6 that detects subscriber characteristics and aids diagnoses of network errors associated with a subscriber network 16. In this example, system 2 includes service provider 4 and subscriber network 16. Although only a single subscriber network 16 is shown, service provider 4 may provide network access and other services to multiple subscribers. For example, service provider 4 may supply subscriber network 16 with access to the Internet 15, an online gaming service, an Internet radio service, or any other service wherein subscriber network 16 and the service provider exchange packets.

Service provider 4 and subscriber network 16 communicate via a network connection. The network connection may be a computer network, a local area network, a telephone wire, a coaxial cable, a computer networking cable, fiber optic cable, a wireless signal, or any another communication medium.

In the example of FIG. 1, subscriber 6 represents an individual subscriber and may be a residential or commercial customer of service provider 4. As illustrated in FIG. 1, subscriber 6 utilizes a plurality of network-enabled devices 22A through 22N (collectively, "subscriber devices 22"). Subscriber devices 22 may be computers, personal digital assistants, network telephones, television set top boxes, kitchen appliances, and music receivers, or game consoles with network capabilities, such as the XBOX manufactured by Microsoft Corp. of Redmond, Wash. Gateway 18 allows devices 22 to access service provider 4. Devices 22 and gateway 18 communicate through a subscriber network 20. Gateway 18 may be a telephone or cable modem, router, or other device supporting connectivity for one or more devices.

For subscriber devices 22 to use a service provided by service provider 4, subscriber devices 22 send packets through gateway 18 to service provider 4. As the packets arrive at service provider 4, ASM 6 generates copies of the packets. ASM 6 transparently detects and analyzes subscriber characteristics embedded in the copied packets. ASM 6 concurrently forwards all of the original network packets to service provider network 8. If, for example, service provider 4 is an Internet Service Provider (ISP), devices in service provider network 8 may then forward the network packets to the Internet.

When ASM 6 receives a packet, ASM 6 inspects the packet to identify a network conversation to which the packet belongs. A network conversation is a series of packets flowing from a first device to a second device and from the second device to the first device in a particular communications protocol. Once ASM 6 has identified a network conversation to which the packet belongs, ASM 6 analyzes a packet flow in the network conversation to detect the existence of a subscriber characteristic in the network flow. A subscriber characteristic is a fact about a subscriber that is of interest to service provider 4. When ASM 6 determines that a subscriber characteristic exists in a packet flow, ASM 6 may record the existence of a subscriber characteristic. ASM 6 may then analyze patterns of one or more detected subscriber characteristics to diagnose a network error associated with the subscribers. For example, suppose that ASM 6 detects the subscriber characteristic that a device associated with subscriber network 16 uses 64-bit encryption. ASM 6 may then conclude that subscriber network 16 is encountering a network error because the service provided by service provider 4 requires 128-bit encryption.

In order to detect some subscriber characteristics, ASM 6 may inspect the payload of the each packet in a packet flow. By inspecting payloads of packets, ASM 6 may detect more subscriber characteristics than would be possible by simply inspecting packet headers. For example, ASM 6 may detect subscriber characteristics indicating the types of subscriber devices 22, the operating systems subscriber devices 22 are using, the versions of the operating systems subscriber devices 22 are using, the applications on subscriber devices 22 sending packets, and so on.

In addition, ASM 6 may detect protocol-specific subscriber characteristics. A protocol-specific subscriber characteristic describes a pattern in a lower level of the network stack. For example, a protocol-specific subscriber characteristic may describe a pattern wherein a subscriber device consistently sends packets with malformed Hypertext Transfer Protocol (HTTP) headers. Moreover, ASM 6 allows an administrator 36 to define compound characteristics. Compound characteristics may specify, for example, any combination of textual and non-textual (e.g., binary) patterns and protocol-specific characteristic definitions.

In addition to detecting subscriber characteristics, ASM 6 analyzes patterns of detected subscriber characteristics to draw conclusions about the subscribers. These conclusions could be used to diagnose a network error associated with a subscriber. For instance, when ASM 6 detects that a subscriber is displaying or has displayed certain sets of subscriber characteristics, ASM 6 may conclude that the subscriber is encountering or will likely encounter a network error. As an example, if ASM 6 detects that subscriber network 16 is sending malformed HTTP headers and ASM 6 detects that subscriber gateway 18 associated with subscriber network 16 is using an outdated firmware package, ASM 6 could conclude that given the malformed headers and the outdated firmware package, subscriber gateway 18 is likely misconfigured. Alternatively, ASM 6 could conclude that another device associated with subscriber network 16 misconfigured or is hosting a malicious software application, e.g., a virus, a worm, or spyware. As another example, a network error may result from a combination of an application and a failure in service provider network 8. For instance, router failure in service provider network 8 may reduce bandwidth, resulting in an application malfunction. ASM 6 could then supply this information to a customer service representative when subscriber network 16 calls service provider 4 to complain about a network problem.

In this manner, ASM 6 offers service provider 4 a powerful, flexible, and unobtrusive tool to analyze and collect information about subscribers. For example, service provider 4 may define rules and appropriate subscriber characteristic definitions to autonomically collect information about subscriber network 16. Service provider 4 could use this subscriber information for a wide variety of purposes. For instance, service provider 4 could use the subscriber information to assist or automatically diagnose problems encountered by the subscriber in using the service. Moreover, the subscriber information could also be used to alert subscribers to potential future problems. Further, service provider 4 could use the subscriber information to perform market research. That is, service provider 4 could use ASM 6 to look at the types of devices and behaviors that subscribers use and display.

Figure 2:
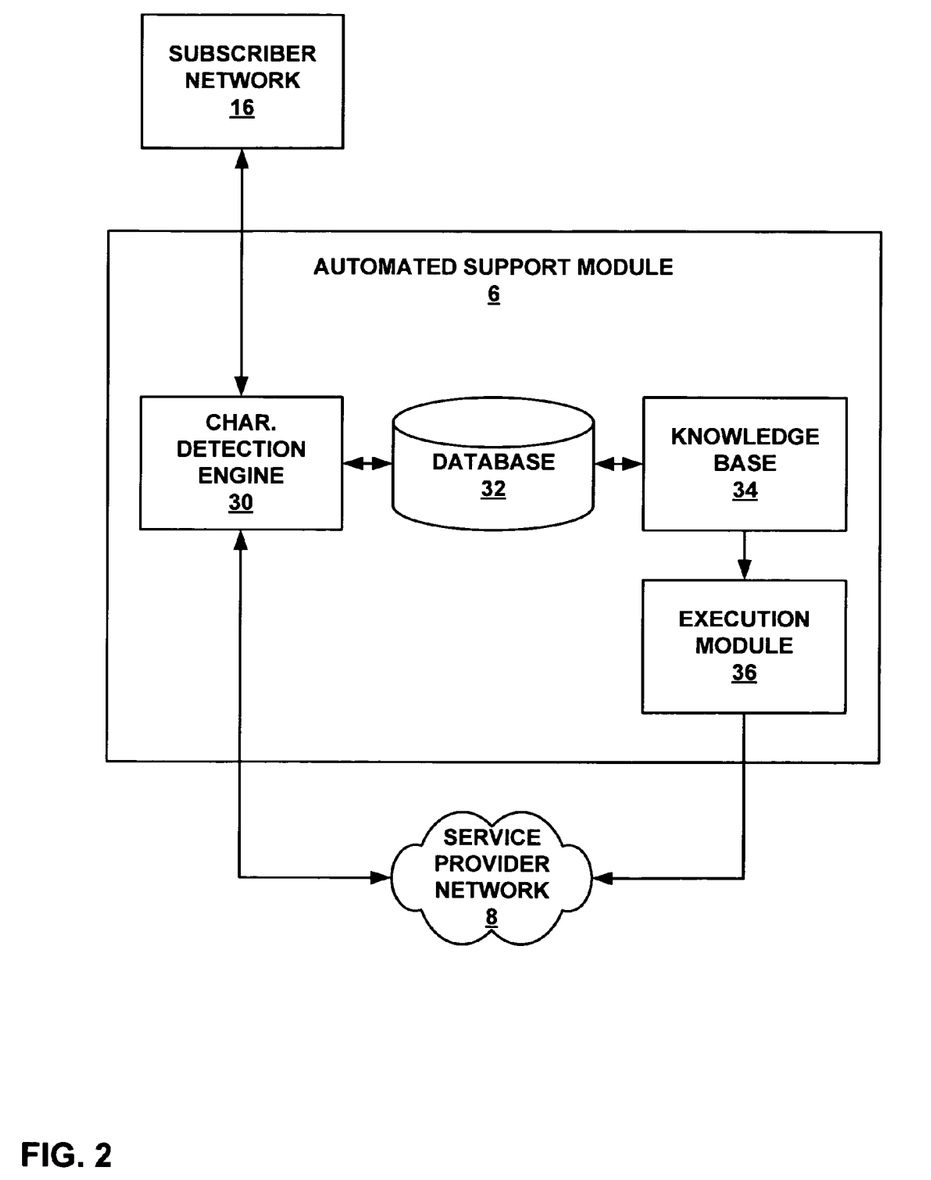
FIG. 2 is a block diagram illustrating an exemplary embodiment of the automated support module of FIG. 1 in further detail.

FIG. 2 is a block diagram illustrating an example embodiment of an ASM 6. In this embodiment, ASM 6 includes a characteristic detection engine (CDE) 30, a database 32, a knowledge base 34, and an execution module 36.

CDE 30 receives and analyzes packets passing between subscriber network 16 and service provider network 8. Upon receiving a packet, CDE 30 generates a copy of the packet. CDE 30 then forwards the copied packet. To analyze the packets, CDE 30 first identifies flows of packets received from subscriber network 16. CDE 30 then performs packet analysis to detect subscriber characteristics in the packet flows. For example, CDE 30 may examine packet headers, footers, and payloads to extract information related to application-layer communications from subscriber network 16. If the sending device has encapsulated one packet within another packet as is the case with virtual tunnels, CDE 30 may strip away multiple layers of encapsulation to reach the desired header, footer, or payload. Moreover, CDE 30 may form application-layer communications. CDE 30 then examines the application-layer communications to detect one or more subscriber characteristics. If CDE 30 detects a subscriber characteristic in a packet flow, CDE 30 creates an entry in database 32 that records at least the characteristic and the subscriber responsible for sending the packet flow.

Knowledge base 34 analyzes patterns of subscriber characteristics to draw conclusions about subscribers. In particular, knowledge base 34 checks database 32 to establish which subscriber characteristics exist for a certain subscriber. Knowledge base 34 then determines whether a pattern of characteristics exist for the subscriber among the detected characteristics. If the pattern exists, knowledge base 34 may decide that a conclusion is likely true. Knowledge base 34 may apply the rules to form the conclusions prior to or after receiving a support request from subscriber 4. As an example, suppose that knowledge base 34 examines database 32 and determines that a device belonging to subscriber network 16 is currently running the Windows operating system from Microsoft Corp. of Redmond, Wash. When subscriber network 16 places a telephone call to service provider 4 with a complaint about a network error, service provider 4 may receive information from the subscriber about the network error. In particular, service provider 4 may learn that the device is currently running a particular software application. By providing the information about the software application to knowledge base 34, the knowledge base may use the information from the subscriber in conjunction with the detected characteristics to diagnose the network error. Given these the two facts, knowledge base 34 may suggest that it is likely true that subscriber network 16 is encountering the particular network error due to a known incompatibility between Windows and the software application.

Administrator 36 may specify rules that define the patterns knowledge base 34 looks for as well as the conclusions that knowledge base 34 draws when the patterns are detected. As new problems arise after service provider 4 installs ASM 6, administrator 36 may add, edit, or delete subscriber characteristics, patterns and conclusions from knowledge base 34. In addition, if administrator 36 equips knowledge base 34 with an adaptive learning module, knowledge base 34 may learn new patterns and conclusions based on user feedback related to the success or failure in aiding the diagnosis of network errors. For example, the adaptive learning module may implement an artificial neural network, a decision tree algorithm, an expectation-maximization algorithm, a nearest-neighbor pattern recognition algorithm, a Bayesian network, or another machine learning technique. In this way, ASM 6 is adaptable to changing conditions and situations.

Execution module 36 may perform an action based on the diagnosis made by knowledge base 34. For example, if knowledge base 34 concludes that subscriber network 16 is using a device that has incompatible software, execution module 36 may direct the subscriber to a web page describing the incompatibility. Alternatively, execution module 36 may direct an e-mail server to send subscriber network 16 an e-mail describing the incompatibility. Execution module 36 may perform such action in response to a support call initiated by subscriber network 16 in response to a network error. Alternatively, execution module 36 may perform actions prior to receiving support requests from users in order to anticipate and eliminate potential network errors.

Agents other than CDE 30 may insert subscriber characteristics into database 32. For example, a customer service representative may enter a subscriber characteristic into database 32 based on information received from a subscriber during a telephone interview. As a second example, execution module 36 may insert a subscriber characteristic into database 32 in response to an action enabled by knowledge base 34. Other exemplary agents may include administrator 36, a subscriber, a software module, or another agent capable of interacting directly or indirectly with database 34. In this way, ASM 6 may combine subscriber characteristics derived from various agents.

Figure 3:
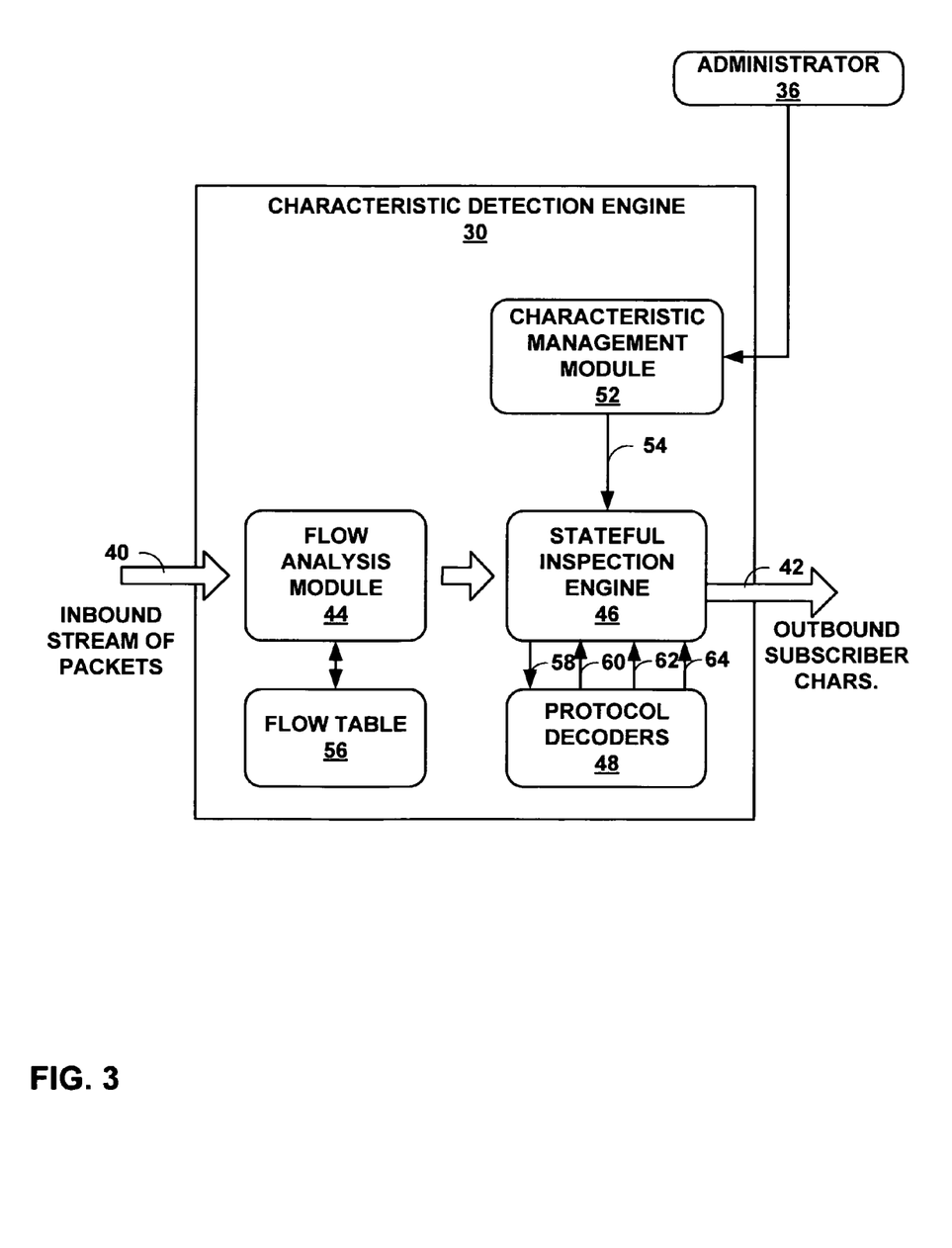
FIG. 3 is a block diagram illustrating an exemplary embodiment of a characteristic detection engine.

FIG. 3 is a block diagram illustrating an exemplary embodiment of a CDE 30 in accordance with the principles of this invention. CDE 30 transparently monitors an inbound stream of packets 40 and outputs detected subscriber characteristics 42. In this example, CDE 30 includes a flow analysis module 44, a stateful inspection engine 46, a set of protocol decoders 48, a characteristic management module 52, and a flow table 56.

Characteristic management module 52 supplies an interface through which administrator 36 supplies one or more definitions of subscriber characteristics. Characteristic management module 52 then forwards the definitions of subscriber characteristics as characteristic definitions 54 to stateful inspection engine 46.

Flow analysis module 44 separates a stream of packets 40 into packet flows. Each packet flow represents a communication session within stream of packets 40 identified by at least a source address, a destination address and a communication protocol. Flow analysis module 44 may utilize additional information to specify network flows, including source media access control (MAC) address, destination MAC address, source port and destination port. Flow analysis module 44 maintains data within a flow table 56 that describes each active packet flow present within stream of packets 40.

For each packet flow, stateful inspection engine 46 buffers a copy of the packets and reassembles the copied packets to form application-layer communications 58. For example, stateful inspection engine 46 may reconstruct transmission control protocol (TCP) segments into application-layer communications 58, which represent protocol-specific messages. Stateful inspection engine 46 may then process the application-layer communications to determine whether the buffered packet flows include the subscriber characteristic.

To process the application-layer communications 58, stateful inspection engine 46 invokes an appropriate one of protocol decoders 48. Protocol decoders 48 represent a set of one or more protocol-specific hardware or software modules. Each of protocol decoders 48 corresponds to a different communication protocol or service. Examples of communication protocols that may be supported by protocol decoders 48 include the HyperText Transfer Protocol (HTTP), the File Transfer Protocol (FTP), the Network News Transfer Protocol (NNTP), the Simple Mail Transfer Protocol (SMTP), Telnet, Domain Name System (DNS), Gopher, Finger, the Post Office Protocol (POP), the Secure Socket Layer (SSL) protocol, the Lightweight Directory Access Protocol (LDAP), Secure Shell (SSH), Server Message Block (SMB) and other protocols.

Protocol decoders 48 analyze reassembled application-layer communications 58 and output transaction elements 60 that identify application-layer transactions. In particular, transaction elements 60 indicate when a series of related application-layer communications between two peer devices starts and ends. In addition, protocol decoders 48 analyze application-layer communications 58 and extract protocol-specific data strings. As used herein, the term "application-layer elements" refer to protocol-specific text strings obtained at the application layer. In particular, protocol decoders 48 extract protocol-specific "contexts" and "values" from the reassembled application-layer communications. In general, "contexts" are named elements within a protocol stream that uniquely identify various types of application-level elements. The named elements provide an application-level basis for describing a communication session.

Examples of contexts include file names, user names, application names, names of attached documents, protocol-specific header information, protocol-specific authorization data, form data and other information that describes the communication session. As a particular example, a context for an HTTP protocol stream may include the name of a server providing the HTTP service and the name of the type of web browser (e.g., "Internet Explorer") accessing the server. By reassembling application-layer communications, protocol decoders 48 extract specific contexts (e.g., browser type) and corresponding values (e.g., "Internet Explorer"). Protocol decoders 48 output application-layer elements 62 to stateful inspection engine 46 for subsequent analysis.

In addition, protocol decoders 48 apply protocol-specific algorithms to application-layer communications 58 to identify protocol-specific elements within each transaction. Protocol-specific elements describe a communication session on lower levels of the network stack (e.g., network layer, transport layer, etc.). For example, an HTTP protocol decoder may identify that a subscriber device sends universal resource locators (URLs) that overflow a URL buffer. Protocol decoders 48 output protocol-specific characteristics 64 to stateful inspection engine 46 for further analysis and use in subscriber characteristic detection.

Stateful inspection engine 46 receives transaction elements 60, application-layer elements 62 and protocol-specific elements 64 from protocol decoders 48. Stateful inspection engine 46 then examines the extracted transaction elements 60, application-layer elements 62, and protocol-specific elements 64 to detect the existence of subscriber characteristics described by characteristic definitions 54. In the event that stateful inspection engine 46 detects a subscriber characteristic, the stateful inspection engine stores the subscriber characteristic in database 32.

Figure 4:
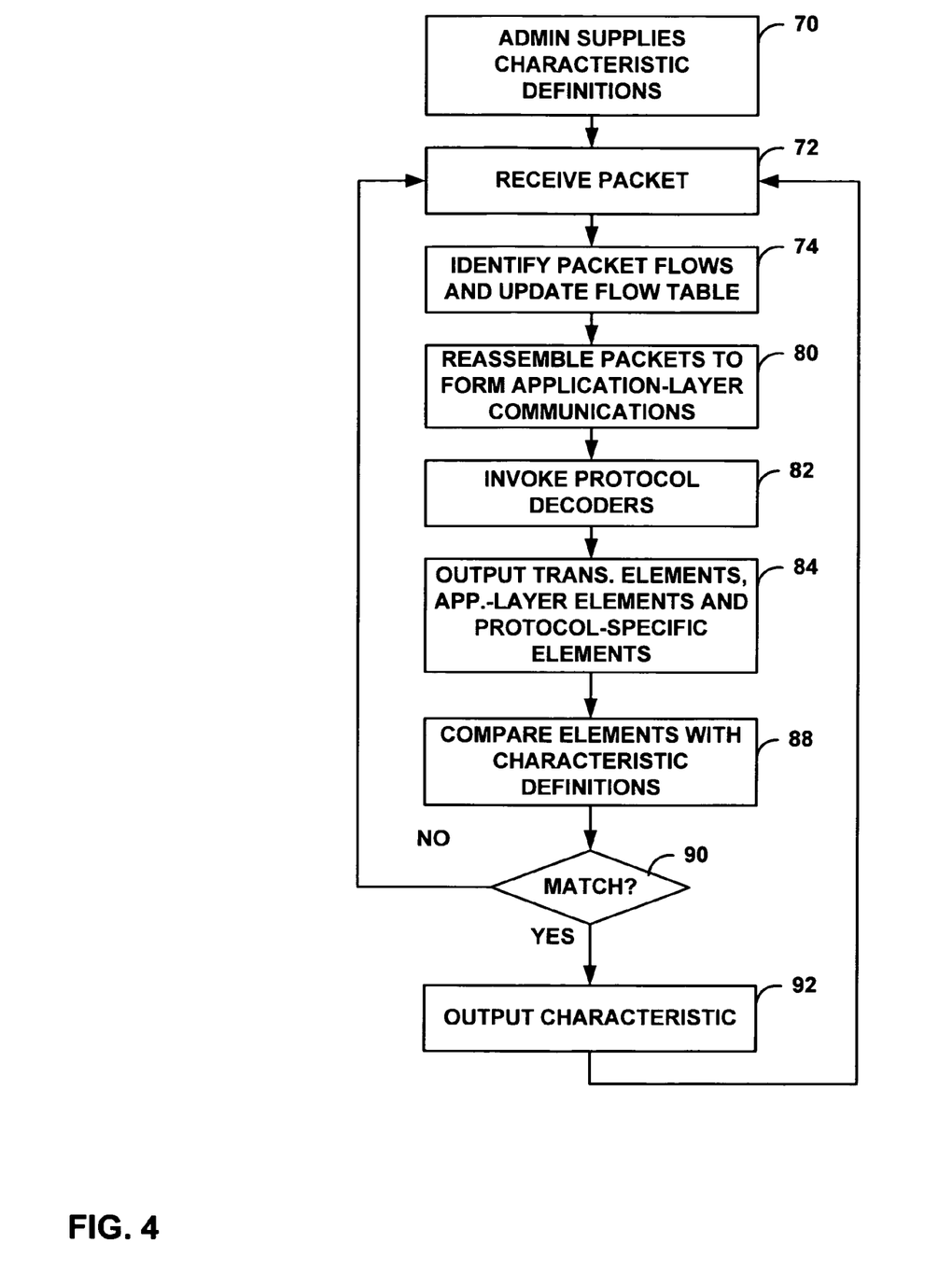
FIG. 4 is a flowchart illustrating exemplary operation of the characteristic detection engine of FIG. 3.

FIG. 4 is a flowchart illustrating exemplary operation of a characteristic detection engine 30 (FIG. 3) in accordance with the principles of the invention. Initially, administrator 36 supplies a set of characteristic definitions 54 to characteristic management module 52 (70). Characteristic management module 52 may supply a user interface that allows administrator 36 to specify characteristic definitions 54.

Upon receiving a packet (72), flow analysis module 44 analyzes the packet to identify an associated packet flow and updates flow table 56 to describe the packet flow (74). Next, stateful inspection engine 46 buffers and reassembles the packets in the packet flow to form application-layer communications 58 (80). Stateful inspection engine 46 then invokes the appropriate protocol decoders 48 to analyze the application-layer communications (82). Protocol decoders 48 analyze reassembled application-layer communications 58 and communicate transaction elements 60, application-layer elements 62 and protocol-specific elements 64 to stateful inspection engine 46 (84).

Upon receiving transaction elements 60, application-layer elements 62 and protocol-specific elements 64 from protocol decoders 48, stateful inspection engine 46 compares these elements with characteristic definitions 54 to detect the existence of subscriber characteristics (88). When comparing the elements with a compound characteristic definition, stateful inspection engine 46 determines whether all of the specified patterns or protocol-specific elements are satisfied for any given communication session between peers, either on a per-transaction basis or over the lifetime of the communication session, as specified by the characteristic definition. Moreover, if required by a compound characteristic definition, stateful inspection engine 46 may determine whether the specified patterns and protocol-specific elements are satisfied in a required relationship. The relationship may be a specific combination, order, or other complex association of elements.

If stateful inspection engine 46 does not detect a subscriber characteristic (90), stateful inspection engine 46 continues to process incoming packets (72). However, if stateful inspection engine 46 detects a subscriber characteristic (90), stateful inspection engine 46 outputs the detected subscriber characteristic to database 32 (92). ASM 6 is then free to receive and analyze another packet (72).

Figure 5:
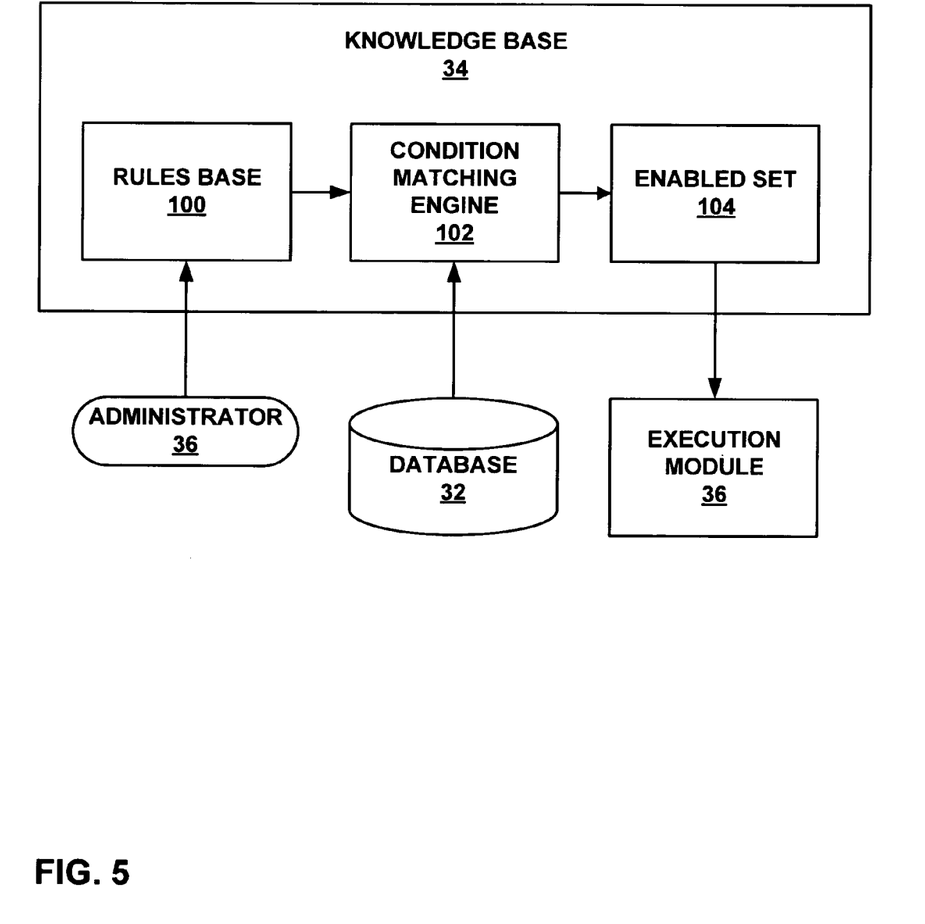
FIG. 5 is a block diagram illustrating an exemplary embodiment of a knowledge base.

FIG. 5 is a block diagram illustrating an exemplary embodiment of knowledge base 34 in accordance with the principles of this invention. In this embodiment, knowledge base 34 comprises a rules base 100, a condition matching engine 102, and an enabled set 104.

Rules engine 100 contains rules describing patterns of subscriber characteristics and associated conclusions. In one embodiment, each rule in rules base 100 has a condition and a conclusion. The condition part of the rule supplies an expression involving detected subscriber characteristics and/or other rules. The conclusion part of the rule specifies a conclusion that may be drawn when the condition is satisfied, i.e, when the expression evaluates to true. For example, suppose knowledge base 34 contains the following condition-conclusion rule:

{subscriber.device1.OperatingSystem="Windows XP" AND subscriber.device1.Application="Game X"}
-->
{"Subscriber has the Windows XP-Game X incompatibility problem."}

Then, if the subscriber characteristics stored in database 32 show that subscriber network 16 has used Windows XP on a device and has used the application "Game X" on the same device, then the conditions of this rule have been satisfied. Once the conditions of the rule have been satisfied, knowledge base 34 draws the corresponding conclusion. In this case, the conclusion is that "Subscriber has the Windows XP-Game X incompatibility problem."

Condition matching engine 102 determines whether the conditions defined in rule base 100 enable an action. Specifically, condition matching engine 102 compares characteristics in database 32 against the conditions specified in rule base 100. If all of the conditions of a conclusion are true, then condition matching engine 102 places a reference to the conclusion in enabled set 104. In other words, enabled set 104 contains a set of rule instances that match the facts. A rule instance is a rule with the open slots filled in. At any point in time, the rule could be satisfied for several subscribers. For example, in the rule stated above, a rule instance for subscriber.device1.OperatingSystem="Window XP" may be "Bob Johnson"."Desktop PC".OperatingSystem="Windows XP".

Execution module 36 selects a rule instance in enabled set 104 and executes an action of the selected rule instance. The action may cause execution module 36 to do a number of things. For example, the action may cause execution module 36 to derive a conclusion about a subscriber characteristic. Execution module 36 may record the derived subscriber characteristic back into database 32. Recording a derived subscriber characteristic in database 32 may trigger condition matching engine 102 to add other rule instances to enabled set 104. Adding derived subscriber characteristics may result in rule chaining, i.e., one rule may trigger another. In this manner, database 32 may act as a working memory of knowledge base 34. A different action may trigger execution module 36 to send a message to the outside world or to send diagnostic information to a diagnostic software package that helps to troubleshoot subscriber complaints. Execution module 36 iterates the process of picking a rule instance from enabled set 104 and executing the action associated with the rule instance.

In addition, knowledge base 34 may include a truth maintenance system (not shown). The truth maintenance system keeps track of whether subscriber characteristics in database 32 remain true. If a supporting characteristic is removed, this can trigger a retraction of all subscriber characteristics that depend on the supporting subscriber characteristic. For example, if the subscriber of the above example changes to Linux, reality no longer supports the "subscriber has Windows XP-Game X incompatibility" characteristic. In this case, the truth maintenance system retracts the incompatibility characteristic. The retraction may subsequently cause execution module 36 to send a "problem solved" email.

Subscriber characteristics in database 32 and rules in rule base 100 may be probabilistic. For example, some network conversations may strongly or wealdy suggest a subscriber characteristic. Some condition-conclusion rules may not be hard and fast, but only strongly suggest a subscriber characteristic rather than definitively suggest the subscriber characteristic. Knowledge base 34 may include a mechanism that combines certainties of subscriber characteristics matching a condition pattern and certainties of a rule to derive a certainty of a conclusion. Execution module 36 may use the certainty of the conclusions to prioritize which rule instance in enabled set 104 to select next. Execution module 34 may use Bayesian methods for this purpose.

Various embodiments of the invention have been described. Although the embodiments have been described in terms of packet-based systems and methods, network and application-layer subscriber characteristics may be correlated to aid the diagnosis and resolution of errors experienced by customers of other types of networks without departing from the principles of the invention. These and other embodiments are within the scope of the following claims.

The invention claimed is:

1. A method comprising: receiving a stream of packets associated with an end-user device of a subscriber network with an intermediate network device positioned within a service provider network, wherein the service provider network provides the subscriber network access, where to a public network; separating, with the intermediate network device, the stream of packets from the end-user device into a set of packet flows; forming application-layer communications from each packet flow in the set of packet flows; extracting protocol-specific elements from the application-layer communications that describe a communication session on lower levels of a network stack; analyzing the protocol-specific elements to detect the existence of a subscriber characteristic in the packet flow, wherein the subscriber characteristic includes information related to operation of the end-user device located within the subscriber network; diagnosing, with a rule-based system, a suggested cause of a network error occurring within the subscriber network using the subscriber characteristic, wherein the suggested cause specifies a misconfiguration of the end-user device operating within the subscriber network; and outputting the suggested cause of the network error to a service technician associated with the service provider network.

2. The method of claim 1, further comprising: extracting transaction elements from the application-layer communications that indicate when a series of related application-layer communications between two peer devices starts and ends; and analyzing the transaction elements to detect the existence of the subscriber characteristic in the packet flow.

3. The method of claim 1, further comprising: extracting application-layer elements from the application-layer communications that describe a communication session on an application level; and analyzing the application-layer elements to detect the existence of the subscriber characteristics in the packet flow.

4. The method of claim 1, wherein receiving the stream of packets comprises:
receiving the stream of packets from a plurality of end-user devices of the subscriber network,
wherein the subscriber network is associated with one or more the end-user devices in the plurality of the end-user devices.

5. The method of claim 4, wherein the plurality of end-user devices include one or more devices selected from the group consisting of computers, personal digital assistants, network telephones, game consoles, television set top boxes, kitchen appliances, and music receivers.

6. The method of claim 1, further comprising creating an entry in a database that records at least a detected subscriber characteristic and a subscriber.

7. The method of claim 1, wherein diagnosing a suggested cause of a network error comprises:
determining whether a pattern of one or more subscriber characteristics exist for the subscriber among the detected characteristics; and
drawing a conclusion as to the cause of the network error based on the determination.

8. The method of claim 7,
wherein determining whether a pattern exists comprises determining whether a condition involving detected subscriber characteristics is satisfied; and
wherein drawing the conclusion based on the determination comprises drawing the conclusion when the condition is satisfied.

9. The method of claim 7, further comprising receiving the patterns and the conclusions from an administrator.

10. The method of claim 9, wherein receiving the patterns and actions comprises receiving a set of condition-conclusion rules.

11. The method of claim 7, further comprising learning the patterns and conclusions based on user feedback.

12. The method of claim 7, wherein drawing a conclusion as to the cause of the network error is based on determining that the network error results from an incompatibility between two software applications.

13. The method of claim 1, wherein the network error results from a combination of an application and a failure in a network provided by the service provider associated with the stream of packets.

14. The method of claim 1, wherein diagnosing a suggested cause of a network error comprises:
receiving information from the subscriber about the network error; and
using the information from the subscriber in conjunction with the detected characteristics to aid diagnosis of the network error.

15. The method of claim 14, wherein receiving information from the subscriber comprises receiving information from the subscriber through a telephone call.

16. The method of claim 1, further comprising performing an action based on the diagnosis.

17. The method of claim 16, wherein performing actions comprises directing the subscriber to a web page.

18. The method of claim 16, wherein performing actions comprises directing an e-mail server to send an e-mail.

19. The method of claim 16, wherein performing actions comprises sending diagnostic information to a diagnostic software package that aids troubleshooting subscriber complaints.

20. The method of claim 1, further comprising receiving definitions of subscriber characteristics from an administrator.

21. The method of claim 1, further comprising forwarding the stream of packets transparently.

22. The method of claim 1, further comprising receiving a subscriber characteristic from an agent.

23. A system comprising: a characteristic detection engine configured to receive a stream of packets associated with an end-user device of a subscriber network, the characteristic detection engine comprising: a flow analysis module configured to separate a stream of packets into a set of packet flows; and a stateful inspection engine configured to form application-layer communications from the set of packet flows, and analyze protocol-specific elements extracted from the application-layer communications by a set of protocol decoders to detect the existence of a subscriber characteristic in the set of packet flows, wherein the protocol-specific elements describe a communication session on lower levels of a network stack, wherein the subscriber characteristic includes information related to operation of the end-user device located within the subscriber network, and wherein the service provider network provides the subscriber network access to a public network; a knowledge base configured to diagnose a suggested cause of a network error occurring within the subscriber network using the subscriber characteristic detected by the characteristic detection engine, wherein the suggested cause specifies a misconfiguration of the end-user device operating within the subscriber network; and an automated support module configured to output the suggested cause of the network error to a service technician associated with a service provider of the subscriber network.

24. The system of claim 23, wherein the set of protocol decoders extracts transaction elements from the application-layer communications that indicate when a series of related application-layer communications between two peer devices starts and ends, and wherein the stateful inspection engine analyzes the transaction elements to detect the existence of the subscriber characteristics in the packet flow.

25. The system of claim 23,
wherein the set of protocol decoders that extracts application-layer elements from the application-layer communications that describe a communication session on an application level, and wherein the stateful inspection engine analyzes the application-layer elements to detect the existence of the subscriber characteristics in the packet flow.

26. The system of claim 23, wherein the characteristic detection engine receives a stream of packets from a plurality of end-user devices of the subscriber network.

27. The system of claim 26, wherein the plurality of end-user devices include one or more devices selected from the group consisting of computers, personal digital assistants, network telephones, game consoles, television set top boxes, kitchen appliances, and music receivers.

28. The system of claim 23, further comprising a database that hold entries that record at least a detected subscriber characteristic and a subscriber.

29. The system of claim 23, wherein the knowledge base determines whether a pattern of one or more subscriber characteristics exists for the subscriber among the detected characteristics and draws a conclusion based on the determination.

30. The system of claim 29, wherein the knowledge base includes an adaptive learning module that learns the patterns and conclusions based on user feedback.

31. The system of claim 29, wherein the knowledge base receives the patterns and the conclusions from an administrator.

32. The system of claim 23, wherein the knowledge base comprises:
a rules base that holds condition-conclusion rules, wherein each of the condition-conclusion rules has a condition and a conclusion based on the detected subscriber characteristics;
a condition matching engine that enables the conclusion when the condition is satisfied; and
an enabled set that holds references to enabled conclusions.

33. The system of claim 23, wherein the network error results from an incompatibility between two software applications.

34. The system of claim 23, wherein the network error results from a combination of an application and a failure in a network provided by the service provider.

35. The system of claim 23, wherein the knowledge base receives information from a subscriber about the network error and uses the information from the subscriber in conjunction with the detected characteristics to diagnose the network error.

36. The system of claim 35, wherein the subscriber supplies the information through a telephone call.

37. The system of claim 23, further comprising an execution module configured to execute an action based on the diagnosis.

38. The system of claim 23, wherein an administrator provides definitions of the subscriber characteristics to the characteristic detection engine.

39. The system of claim 23, wherein the characteristic detection engine forwards the stream of packets transparently.

40. The system of claim 23, wherein the knowledge base diagnoses the suggested cause of the network error using a subscriber characteristic received from an agent.

41. A non-transitory computer-readable medium comprising instructions for causing a processor to: receive a stream of packets associated with an end-user device of a subscriber network with an intermediate network device positioned within a service provider network, wherein the service provider network provides the subscriber network access to a public network; separate a stream of packets into a set of packet flows; form application-layer communications from each packet flow in the set of packet flows; extract protocol-specific elements from the application-layer communications that describe a communication session on lower levels of a network stack; analyze the protocol-specific elements to detect the existence of a subscriber characteristic in the packet flow, wherein the subscriber characteristic includes information related to operation of the end-user device located within the subscriber network; diagnose a suggested cause of a network error occurring within the subscriber network with a rule-based system using detected subscriber characteristics, wherein the suggested cause specifies a misconfiguration of the end-user device operating within the subscriber network;

and output the suggested cause of the network error to a service technician associated with a service provider of the subscriber network.

42. The non-transitory computer-readable medium of claim 41, wherein the instructions that cause the processor to use the detected subscriber characteristics cause the processor to: determine whether the detected characteristics satisfy a condition of a condition-conclusion rule; and enable a conclusion of the condition-conclusion rule when the condition is satisfied.

43. the non-transitory computer-readable medium of claim 41, wherein the instructions further cause the processor to perform an action based on the diagnosis.

* * * * *